United States Patent
Parsche

(10) Patent No.: US 8,494,775 B2
(45) Date of Patent: Jul. 23, 2013

(54) REFLECTOMETRY REAL TIME REMOTE SENSING FOR IN SITU HYDROCARBON PROCESSING

(75) Inventor: Francis Eugene Parsche, Palm Bay, FL (US)

(73) Assignee: Harris Corporation, Melbourne, FL (US)

(*) Notice: Subject to any disclaimer, the term of this patent is extended or adjusted under 35 U.S.C. 154(b) by 551 days.

(21) Appl. No.: 12/396,284

(22) Filed: Mar. 2, 2009

(65) Prior Publication Data

US 2010/0223011 A1 Sep. 2, 2010

(51) Int. Cl.
*G01V 1/40* (2006.01)
*G01V 3/00* (2006.01)

(52) U.S. Cl.
USPC .................................. 702/11; 324/348

(58) Field of Classification Search
USPC ............... 702/11, 1–2, 6–7, 12–13, 57, 79, 702/81, 84, 127, 130–131, 133, 137–138, 702/182–183, 188–189; 166/244.1, 250.01, 166/250.06, 252.1, 266, 268–269, 272.1, 166/272.3, 272.7, 305.1, 306, 312; 324/323–324, 348, 351, 354–355
See application file for complete search history.

(56) References Cited

U.S. PATENT DOCUMENTS

| | | | |
|---|---|---|---|
| 2,371,459 A | 3/1945 | Mittelmann |
| 2,685,930 A | 8/1954 | Albaugh |
| 3,497,005 A | 2/1970 | Pelopsky |
| 3,848,671 A | 11/1974 | Kern |
| 3,954,140 A | 5/1976 | Hendrick |
| 3,988,036 A | 10/1976 | Fisher . |
| 3,991,091 A | 11/1976 | Driscoll |
| 4,035,282 A | 7/1977 | Stuchberry et al. |
| 4,042,487 A | 8/1977 | Seguchi |
| 4,087,781 A | 5/1978 | Grossi et al. |
| 4,136,014 A | 1/1979 | Vermeulen |
| 4,140,179 A | 2/1979 | Kasevich et al. |

(Continued)

FOREIGN PATENT DOCUMENTS

| | | |
|---|---|---|
| CA | 1199573 A1 | 1/1986 |
| CA | 2678473 | 8/2009 |

(Continued)

OTHER PUBLICATIONS

Nathan Marcuvitz; Waveguide Handbook ; 1986; Institution of Engineering and Technology; vol. 21 of IEE Electromagnetic Waves series; ISBN 0863410588, 9780863410581; p. 1, section 1-1 & p. 66, section 2-3; http://books.google.com/books?id=Ao34iFuNZgIC &Ipg=PP1&ots=dtuoZ2w2cu&dq=waveguide%20handbook&pg.*

(Continued)

*Primary Examiner* — Toan Le
(74) *Attorney, Agent, or Firm* — Allen, Dyer, Doppelt, Milbrath & Gilchrist, P.A.

(57) ABSTRACT

A method and apparatus for sensing conditions in a subsurface geologic formation heated for the extraction of hydrocarbons is disclosed. A time domain reflectometer in conjunction with an open wire transmission line is employed in real time to determine impedance discontinuities in the geologic formation. These impedance discontinuities correspond to physical conditions in the geologic formation. The open wire transmission line can include pipes running into the subsurface geologic formation or other conductors, including a split tube well casing. The method may operate in the low frequency window for subsurface electromagnetic propagation.

16 Claims, 5 Drawing Sheets

U.S. PATENT DOCUMENTS

| | | | | |
|---|---|---|---|---|
| 4,140,180 | A | 2/1979 | Bridges et al. | |
| 4,144,935 | A | 3/1979 | Bridges et al. | |
| 4,146,125 | A | 3/1979 | Sanford et al. | |
| 4,196,329 | A | 4/1980 | Rowland et al. | |
| 4,295,880 | A | 10/1981 | Horner | |
| 4,300,219 | A | 11/1981 | Joyal | |
| 4,301,865 | A | 11/1981 | Kasevich et al. | |
| 4,328,324 | A | 5/1982 | Kock | |
| 4,373,581 | A | 2/1983 | Toellner | |
| 4,396,062 | A * | 8/1983 | Iskander | 166/248 |
| 4,404,123 | A | 9/1983 | Chu | |
| 4,410,216 | A | 10/1983 | Allen | |
| 4,425,227 | A | 1/1984 | Smith | |
| 4,449,585 | A | 5/1984 | Bridges et al. | |
| 4,456,065 | A | 6/1984 | Heim | |
| 4,457,365 | A | 7/1984 | Kasevich et al. | |
| 4,470,459 | A | 9/1984 | Copland | |
| 4,485,869 | A | 12/1984 | Sresty | |
| 4,487,257 | A | 12/1984 | Dauphine | |
| 4,508,168 | A | 4/1985 | Heeren | |
| 4,514,305 | A | 4/1985 | Filby | |
| 4,524,827 | A | 6/1985 | Bridges | |
| 4,531,468 | A | 7/1985 | Simon | |
| 4,583,586 | A | 4/1986 | Fujimoto et al. | |
| 4,620,593 | A | 11/1986 | Haagensen | |
| 4,622,496 | A | 11/1986 | Dattili | |
| 4,645,585 | A | 2/1987 | White | |
| 4,678,034 | A | 7/1987 | Eastlund | |
| 4,703,433 | A * | 10/1987 | Sharrit | 702/76 |
| 4,790,375 | A | 12/1988 | Bridges | |
| 4,817,711 | A | 4/1989 | Jembey | |
| 4,882,984 | A | 11/1989 | Eves, II | |
| 4,892,782 | A | 1/1990 | Fisher et al. | |
| 5,046,559 | A | 9/1991 | Glandt | |
| 5,055,180 | A | 10/1991 | Klaila | |
| 5,065,819 | A | 11/1991 | Kasevich | |
| 5,082,054 | A | 1/1992 | Kiamanesh | |
| 5,136,249 | A * | 8/1992 | White et al. | 324/643 |
| 5,199,488 | A | 4/1993 | Kasevich | |
| 5,233,306 | A | 8/1993 | Misra | |
| 5,236,039 | A | 8/1993 | Edelstein | |
| 5,251,700 | A | 10/1993 | Nelson | |
| 5,293,936 | A | 3/1994 | Bridges | |
| 5,304,767 | A | 4/1994 | McGaffigan | |
| 5,315,561 | A | 5/1994 | Grossi | |
| 5,370,477 | A | 12/1994 | Bunin | |
| 5,378,879 | A | 1/1995 | Monovoukas | |
| 5,506,592 | A | 4/1996 | MacDonald | |
| 5,582,854 | A | 12/1996 | Nosaka | |
| 5,621,844 | A | 4/1997 | Bridges | |
| 5,631,562 | A * | 5/1997 | Cram et al. | 324/333 |
| 5,746,909 | A | 5/1998 | Calta | |
| 5,910,287 | A | 6/1999 | Cassin | |
| 5,923,299 | A | 7/1999 | Brown et al. | |
| 6,045,648 | A | 4/2000 | Palmgren et al. | |
| 6,046,464 | A | 4/2000 | Schetzina | |
| 6,055,213 | A | 4/2000 | Rubbo | |
| 6,063,338 | A | 5/2000 | Pham | |
| 6,097,262 | A * | 8/2000 | Combellack | 333/12 |
| 6,106,895 | A | 8/2000 | Usuki | |
| 6,112,273 | A | 8/2000 | Kau | |
| 6,184,427 | B1 | 2/2001 | Klepfer | |
| 6,229,603 | B1 | 5/2001 | Coassin | |
| 6,232,114 | B1 | 5/2001 | Coassin | |
| 6,301,088 | B1 | 10/2001 | Nakada | |
| 6,303,021 | B2 | 10/2001 | Winter | |
| 6,348,679 | B1 | 2/2002 | Ryan et al. | |
| 6,360,819 | B1 | 3/2002 | Vinegar | |
| 6,432,365 | B1 | 8/2002 | Levin | |
| 6,603,309 | B2 | 8/2003 | Forgang | |
| 6,613,678 | B1 | 9/2003 | Sakaguchi | |
| 6,614,059 | B1 | 9/2003 | Tsujimura et al. | |
| 6,649,888 | B2 | 11/2003 | Ryan et al. | |
| 6,712,136 | B2 | 3/2004 | de Rouffignac | |
| 6,808,935 | B2 | 10/2004 | Levin | |
| 6,923,273 | B2 | 8/2005 | Terry | |
| 6,932,155 | B2 | 8/2005 | Vinegar | |
| 6,950,034 | B2 * | 9/2005 | Pacault et al. | 340/855.2 |
| 6,967,589 | B1 | 11/2005 | Peters | |
| 6,992,630 | B2 | 1/2006 | Parsche | |
| 7,046,584 | B2 | 5/2006 | Sorrells | |
| 7,079,081 | B2 | 7/2006 | Parsche et al. | |
| 7,091,460 | B2 | 8/2006 | Kinzer | |
| 7,109,457 | B2 | 9/2006 | Kinzer | |
| 7,115,847 | B2 | 10/2006 | Kinzer | |
| 7,147,057 | B2 | 12/2006 | Steele | |
| 7,172,038 | B2 | 2/2007 | Terry | |
| 7,205,947 | B2 | 4/2007 | Parsche | |
| 7,228,900 | B2 * | 6/2007 | Schultz et al. | 166/250.01 |
| 7,312,428 | B2 | 12/2007 | Kinzer | |
| 7,322,416 | B2 | 1/2008 | Burris, II | |
| 7,337,980 | B2 | 3/2008 | Schaedel | |
| 7,438,807 | B2 | 10/2008 | Garner et al. | |
| 7,441,597 | B2 | 10/2008 | Kasevich | |
| 7,461,693 | B2 | 12/2008 | Considine et al. | |
| 7,484,561 | B2 | 2/2009 | Bridges | |
| 7,562,708 | B2 | 7/2009 | Cogliandro | |
| 7,623,804 | B2 | 11/2009 | Sone | |
| 8,047,285 | B1 * | 11/2011 | Smith | 166/260 |
| 2002/0032534 | A1 | 3/2002 | Regier | |
| 2004/0031731 | A1 | 2/2004 | Honeycutt | |
| 2005/0199386 | A1 | 9/2005 | Kinzer | |
| 2005/0274513 | A1 * | 12/2005 | Schultz et al. | 166/254.2 |
| 2006/0038083 | A1 | 2/2006 | Criswell | |
| 2007/0108202 | A1 | 5/2007 | Kinzer | |
| 2007/0131591 | A1 | 6/2007 | Pringle | |
| 2007/0137852 | A1 | 6/2007 | Considine et al. | |
| 2007/0137858 | A1 | 6/2007 | Considine et al. | |
| 2007/0187089 | A1 | 8/2007 | Bridges | |
| 2007/0261844 | A1 | 11/2007 | Cogliandro et al. | |
| 2008/0073079 | A1 | 3/2008 | Tranquilla | |
| 2008/0135244 | A1 * | 6/2008 | Miller | 166/272.6 |
| 2008/0143330 | A1 * | 6/2008 | Madio et al. | 324/303 |
| 2009/0009410 | A1 * | 1/2009 | Dolgin et al. | 343/703 |
| 2009/0242196 | A1 | 10/2009 | Pao | |

FOREIGN PATENT DOCUMENTS

| | | |
|---|---|---|
| DE | 10 2008 022176 A1 | 11/2009 |
| EP | 0 135 966 | 4/1985 |
| EP | 0418117 A1 | 3/1991 |
| EP | 0563999 A2 | 10/1993 |
| EP | 1106672 A1 | 6/2001 |
| FR | 1586066 A | 2/1970 |
| FR | 2925519 A1 | 6/2009 |
| JP | 56050119 A | 5/1981 |
| JP | 2246502 A | 10/1990 |
| WO | WO 2007/133461 | 11/2007 |
| WO | 2008/011412 A2 | 1/2008 |
| WO | WO 2008/030337 | 3/2008 |
| WO | WO2008098850 A1 | 8/2008 |
| WO | WO2009027262 A1 | 8/2008 |
| WO | WO2009/114934 A1 | 9/2009 |

OTHER PUBLICATIONS

Guide to SAGD (Steam Assisted Gravity Drainage) Reservoir Characterization Using Geostatistics; 2005; Centre for Computational Statistics; p. 2, section 1.2.*

Nathan Marcuvitz; Waveguide Handbook; 1986; Institution of Engineering and Technology; vol. 21 of IEE Electromagnetic Waves series; ISBN 0863410588, 9780863410581; p. 1, section 1-1 & p. 66, section 2-3; http://books.google.com/books?id=Ao34iFuNZgIC&Ipg=PP1&ots=dtuoZ2w2cu&dq=waveguidec%20handbook&pg.*

Folke Engelmark, Time-Lapse Monitoring of Steam Assisted Gravity Drainage (SAGD) of Heavy Oil Using Multi-Transient Electro-Magnetics (MTEM), 2007 CSPG CSEG Convention, pp. 647-651.*

"Oil sands." Wikipedia, the free encyclopedia. Retrieved from the Internet from: http://en.wikipedia.org/w/index.php?title=Oil_sands&printable=yes, Feb. 16, 2009.

Sahni et al., "Electromagnetic Heating Methods for Heavy Oil Reservoirs." 2000 Society of Petroleum Engineers SPE/AAPG Western Regional Meeting, Jun. 19-23, 2000.

Power et al., "Froth Treatment: Past, Present & Future." Oil Sands Symposium, University of Alberta, May 3-5, 2004.

Flint, "Bitumen Recovery. Technology a Review of Long Term R&D Opportunities." Jan. 31, 2005. LENEF Consulting (1994) Limited.

"Froth Flotation." Wikipedia, the free encyclopedia. Retrieved from the internet from: http://en.wikipedia.org/wiki/Froth_flotation, Apr. 7, 2009.

"Relative static permittivity." Wikipedia, the free encyclopedia. Retrieved from the Internet from http://en.wikipedia.org/w/index/php?title=Relative_static_permittivity&printable=yes, Feb. 12, 2009.

"Tailings." Wikipedia, the free encyclopedia. Retrieved from the Internet from http://en.wikipedia.org/w/index.php? title=Tailings &printable=yes, Feb. 12, 2009.

U.S. Appl. No. 12/886,338, filed Sep. 20, 2010 (unpublished).

Butler, R.M. "Theoretical Studies on the Gravity Drainage of Heavy Oil During In-Situ Steam Heating", Can J. Chem Eng, vol. 59, 1981.

Butler, R. and Mokrys, I., "A New Process (VAPEX) for Recovering Heavy Oils Using Hot Water and Hydrocarbon Vapour", Journal of Canadian Petroleum Technology, 30(1), 97-106, 1991.

Butler, R. and Mokrys, I., "Recovery of Heavy Oils Using Vapourized Hydrocarbon Solvents: Further Development of the VAPEX Process", Journal of Canadian Petroleum Technology, 32(6), 56-62, 1993.

Butler, R. and Mokrys, I., "Closed Loop Extraction Method for the Recovery of Heavy Oils and Bitumens Underlain by Aquifers: the VAPEX Process", Journal of Canadian Petroleum Technology, 37(4), 41-50, 1998.

Das, S.K. and Butler, R.M., "Extraction of Heavy Oil and Bitumen Using Solvents at Reservoir Pressure" CIM 95-118, presented at the CIM 1995 Annual Technical Conference in Calgary, Jun. 1995.

Das, S.K. and Butler, R.M., "Diffusion Coefficients of Propane and Butane in Peace River Bitumen" Canadian Journal of Chemical Engineering, 74, 988-989, Dec. 1996.

Das, S.K. and Butler, R.M., "Mechanism of the Vapour Extraction Process for Heavy Oil and Bitumen", Journal of Petroleum Science and Engineering, 21, 43-59, 1998.

Dunn, S.G., Nenniger, E. and Rajan, R., "A Study of Bitumen Recovery by Gravity Drainage Using Low Temperature Soluble Gas Injection", Canadian Journal of Chemical Engineering, 67, 978-991, Dec. 1989.

Frauenfeld, T., Lillico, D., Jossy, C., Vilcsak, G., Rabeeh, S. and Singh, S., "Evaluation of Partially Miscible Processes for Alberta Heavy Oil Reservoirs", Journal of Canadian Petroleum Technology, 37(4), 17-24, 1998.

Mokrys, I., and Butler, R., "In Situ Upgrading of Heavy Oils and Bitumen by Propane Deasphalting: The VAPEX Process", SPE 25452, presented at the SPE Production Operations Symposium held in Oklahoma City OK USA, Mar. 21-23, 1993.

Nenniger, J.E. and Dunn, S.G., "How Fast is Solvent Based Gravity Drainage?", CIPC 2008-139, presented at the Canadian International Petroleum Conference, held in Calgary, Alberta Canada, 17-19, 2008.

Nenniger, J.E. and Gunnewick, L., "Dew Point vs. Bubble Point: A Misunderstood Constraint on Gravity Drainage Processes", CIPC 2009-065, presented at the Canadian International Petroleum Conference, held in Calgary, Alberta Canada, Jun. 16-18, 2009.

Bridges, J.E., Stesty, G.C., Spencer, H.L. and Wattenbarger, R.A., "Electromagnetic Stimulation of Heavy Oil Wells", 1221-1232, Third International Conference on Heavy Oil Crude and Tar Sands, UNITAR/UNDP, Long Beach California, USA Jul. 22-31, 1985.

Carrizales, M.A., Lake, L.W. and Johns, R.T., "Production Improvement of Heavy Oil Recovery by Using Electromagnetic Heating", SPE115723, presented at the 2008 SPE Annual Technical Conference and Exhibition held in Denver, Colorado, USA, Sep. 21-24, 2008.

Carrizales, M. and Lake, L.W., "Two-Dimensional COMSOL Simulation of Heavy-Oil Recovery by Electromagnetic Heating", Proceedings of the COMSOL Conference Boston, 2009.

Chakma, A. and Jha, K.N., "Heavy-Oil Recovery from Thin Pay Zones by Electromagnetic Heating", SPE24817, presented at the 67th Annual Technical Conference and Exhibition of the Society of Petroleum Engineers held in Washington, DC, Oct. 4-7, 1992.

Chhetri, A.B. and Islam, M.R., "A Critical Review of Electromagnetic Heating for Enhanced Oil Recovery", Petroleum Science and Technology, 26(14), 1619-1631, 2008.

Chute, F.S., Vermeulen, F.E., Cervenan, M.R. and McVea, F.J., "Electrical Properties of Athabasca Oil Sands", Canadian Journal of Earth Science, 16, 2009-2021, 1979.

Davidson, R.J., "Electromagnetic Stimulation of Lloydminster Heavy Oil Reservoirs", Journal of Canadian Petroleum Technology, 34(4), 15-24, 1995.

Hu, Y., Jha, K.N. and Chakma, A., "Heavy-Oil Recovery from Thin Pay Zones by Electromagnetic Heating", Energy Sources, 21(1-2), 63-73, 1999.

Kasevich, R.S., Price, S.L., Faust, D.L. and Fontaine, M.F., "Pilot Testing of a Radio Frequency Heating System for Enhanced Oil Recovery from Diatomaceous Earth", SPE28619, presented at the SPE 69th Annual Technical Conference and Exhibition held in New Orleans LA, USA, Sep. 25-29, 1994.

Koolman, M., Huber, N., Diehl, D. and Wacker, B., "Electromagnetic Heating Method to Improve Steam Assisted Gravity Drainage", SPE117481, presented at the 2008 SPE International Thermal Operations and Heavy Oil Symposium held in Calgary, Alberta, Canada, Oct. 20-23, 2008.

Kovaleva, L.A., Nasyrov, N.M. and Khaidar, A.M., Mathematical Modelling of High-Frequency Electromagnetic Heating of the Bottom-Hole Area of Horizontal Oil Wells, Journal of Engineering Physics and Thermophysics, 77(6), 1184-1191, 2004.

McGee, B.C.W. and Donaldson, R.D., "Heat Transfer Fundamentals for Electro-thermal Heating of Oil Reservoirs",CIPC 2009-024, presented at the Canadian International Petroleum Conference, held in Calgary, Alberta, Canada Jun. 16-18, 2009.

Ovalles, C., Fonseca, A., Lara, A., Alvarado, V., Urrecheaga, K., Ranson, A. and Mendoza, H., "Opportunities of Downhole Dielectric Heating in Venezuela: Three Case Studies Involving Medium, Heavy and Extra-Heavy Crude Oil Reservoirs" SPE78980, presented at the 2002 SPE International Thermal Operations and Heavy Oil Symposium and International Horizontal Well Technology Conference held in Calgary, Alberta, Canada, Nov. 4-7, 2002.

Rice, S.A., Kok, A.L. and Neate, C.J., "A Test of the Electric Heating Process as a Means of Stimulating the Productivity of an Oil Well in the Schoonebeek Field", CIM 92-04 presented at the CIM 1992 Annual Technical Conference in Calgary, Jun. 7-10, 1992.

Sahni, A. and Kumar, M. "Electromagnetic Heating Methods for Heavy Oil Reservoirs", SPE62550, presented at the 2000 SPE/AAPG Western Regional Meeting held in Long Beach, California, Jun. 19-23, 2000.

Sayakhov, F.L., Kovaleva, L.A. and Nasyrov, N.M., "Special Features of Heat and Mass Exchange in the Face Zone of Boreholes upon Injection of a Solvent with a Simultaneous Electromagnetic Effect", Journal of Engineering Physics and Thermophysics, 71(1), 161-165, 1998.

Spencer, H.L., Bennett, K.A. and Bridges, J.E. "Application of the IITRI/Uentech Electromagnetic Stimulation Process to Canadian Heavy Oil Reservoirs" Paper 42, Fourth International Conference on Heavy Oil Crude and Tar Sands, UNITAR/UNDP, Edmonton, Alberta, Canada, Aug. 7-12, 1988.

Sresty, G.C., Dev, H., Snow, R.H. and Bridges, J.E., "Recovery of Bitumen from Tar Sand Deposits with the Radio Frequency Process", SPE Reservoir Engineering, Jan. 85-94, 1986.

Vermulen, F. and McGee, B.C.W., "In Situ Electromagnetic Heating for Hydrocarbon Recovery and Environmental Remediation", Journal of Canadian Petroleum Technology, Distinguished Author Series, 39(8), 25-29, 2000.

Schelkunoff, S.K. and Friis, H.T., "Antennas: Theory and Practice", John Wiley & Sons, Inc., London, Chapman Hall, Limited, pp. 229-244, 351-353, 1952.

Gupta, S.C., Gittins, SD., "Effect of Solvent Sequencing and Other Enhancement on Solvent Aided Process", Journal of Canadian Petroleum Technology, vol. 46, No. 9, pp. 57-61, Sep. 2007.

International Search Report and Written Opinion for International Patent Application No. PCT/US10/025772, mailed Aug. 9, 2010, 16 pgs., Europe.

PCT International Search Report and Written Opinion in PCT/US2010/025765, Jun. 30, 2010.

PCT International Search Report and Written Opinion in PCT/US2010/025769, Jun. 10, 2010.
PCT International Search Report and Written Opinion in PCT/US2010/025763, Jun. 4, 2010.
PCT International Search Report and Written Opinion in PCT/US2010/025807, Jun. 17, 2010.
PCT International Search Report and Written Opinion in PCT/US2010/025804, Jun. 30, 2010.
A. Godio: "Open ended-coaxial Cable Measurements of Saturated Sandy Soils", American Journal of Environmental Sciences, vol. 3, No. 3, 2007, pp. 175-182, XP002583544.
PCT Notification of Transmittal of the International Search Report and the Written Opinion of the International Searching Authority, or the Declaration, in PCT/US2010/025761, dated Feb. 9, 2011.
PCT Notification of Transmittal of the International Search Report and the Written Opinion of the International Searching Authority, or the Declaration, in PCT/US2010/057090, dated Mar. 3, 2011.
"Control of Hazardous Air Pollutants From Mobile Sources", U.S. Environmental Protection Agency, Mar. 29, 2006. p. 15853 (http://www.epa.gov/EPA-AIR/2006/March/Day-29/a2315b.htm).
Von Hippel, Arthur R., Dielectrics and Waves, Copyright 1954, Library of Congress Catalog Card No. 54-11020, Contents, pp. xi-xii; Chapter II, Section 17, "Polyatomic Molecules", pp. 150-155; Appendix C-E, pp. 273-277, New York, John Wiley and Sons.
United States Patent and Trademark Office, Non-final Office action issued in U.S. Appl. No. 12/396,247, dated Mar. 28, 2011.
Patent Cooperation Treaty, Notification of Transmittal of the International Search Report and the Written Opinion of the International Searching Authority, or the Declaration, in PCT/US2010/025808, dated Apr. 5, 2011.

Carlson et al., "Development of the IIT Research Institute RF Heating Process for In Situ Oil Shale/Tar Sand Fuel Extraction—An Overview", Apr. 1981.
"Technologies for Enhanced Energy Recovery" Executive Summary, Radio Frequency Dielectric Heating Technologies for Conventional and Non-Conventional Hydrocarbon-Bearing Formulations, Quasar Energy, LLC, Sep. 3, 2009, pp. 1-6.
Burnhan, "Slow Radio-Frequency Processing of Large Oil Shale Volumes to Produce Petroleum-like Shale Oil," U.S. Department of Energy, Lawrence Livermore National Laboratory, Aug. 20, 2003, UCRL-ID-155045.
Sahni et al., "Electromagnetic Heating Methods for Heavy Oil Reservoirs," U.S. Department of Energy, Lawrence Livermore National Laboratory, May 1, 2000, UCL-JC-138802.
Abernethy, "Production Increase of Heavy Oils by Electromagnetic Heating," The Journal of Canadian Petroleum Technology, Jul.-Sep. 1976, pp. 91-97.
Sweeney, et al., "Study of Dielectric Properties of Dry and Saturated Green River Oil Shale," Lawrence Livermore National Laboratory, Mar. 26, 2007, revised manuscript Jun. 29, 2007, published on Web Aug. 25, 2007.
Kinzer, "Past, Present, and Pending Intellectual Property for Electromagnetic Heating of Oil Shale," Quasar Energy LLC, 28th Oil Shale Symposium Colorado School of Mines, Oct. 13-15, 2008, pp. 1-18.
Kinzer, "Past, Present, and Pending Intellectual Property for Electromagnetic Heating of Oil Shale," Quasar Energy LLC, 28th Oil Shale Symposium Colorado School of Mines, Oct. 13-15, 2008, pp. 1-33.
Kinzer, A Review of Notable Intellectual Property for In Situ Electromagnetic Heating of Oil Shale, Quasar Energy LLC, 2007.

* cited by examiner

US 8,494,775 B2

REFLECTOMETRY REAL TIME REMOTE SENSING FOR IN SITU HYDROCARBON PROCESSING

CROSS REFERENCE TO RELATED APPLICATIONS

This specification is related to U.S. patent application Ser. Nos. 12/396,247 filed Mar. 2, 2009, 12/395,995 filed Mar. 2, 2009, 12/395,945 filed Mar. 2, 2009, 12/396,192 filed Mar. 2, 2009, 12/396,021 filed Mar. 2, 2009, 12/396,057 filed Mar. 2, 2009, 12/395,953 filed Mar. 2, 2009, and 12/395,918 filed Mar. 2, 2009, each of which is hereby incorporated herein in its entirety by reference.

STATEMENT REGARDING FEDERALLY SPONSORED RESEARCH OR DEVELOPMENT

[Not Applicable]

BACKGROUND OF THE INVENTION

The present invention relates to real time sensing of subsurface geological conditions. In particular, the present invention relates to an advantageous apparatus and method for sensing the physical conditions present in a geologic formation during the in situ processing of hydrocarbons.

As the world's standard crude oil reserves are depleted, and the continued demand for oil causes oil prices to rise, oil producers are attempting to process hydrocarbons from bituminous ore, oil sands, tar sands, and heavy oil deposits. These materials are often found in naturally occurring mixtures of sand or clay. Because of the extremely high viscosity of bituminous ore, oil sands, oil shale, tar sands, and heavy oil, the drilling and refinement methods used in extracting standard crude oil are typically not available. Therefore, recovery of oil from these deposits requires heating to separate hydrocarbons from other geologic materials and to maintain hydrocarbons at temperatures at which they will flow. Steam is typically used to provide this heat, although electric and radio frequency heating is sometimes employed. The heating and processing can take place in-situ, or in another location after strip mining the deposits.

During in-situ processing, it is extremely difficult to sense in real time the conditions in the deposit and/or the well bore. There is often uncertainty regarding the stage of the process, e.g., whether the hydrocarbons are indeed flowing. Valuable time and heat energy are wasted in unsuccessful attempts at in-situ processing when low formation permeability conditions prevent diffusion of steam and limit heating, or when steam and heat moves away from a zone that is targeted for heating through formation fractures or through high permeability materials.

Electrical transmission lines are commonly used for conveying radio frequency (RF) energy from one location to another. Such lines include shielded and unshielded types, e.g. coaxial cable and open wire types respectively. As unshielded transmission lines are open to surroundings, they can transduce electromagnetic fields into the media in which they are immersed. Thus, there may be a need for a low frequency electromagnetic transducer, such as an antenna that can penetrate dissipative media.

Conventional electromechanical "well logging" is presently used to monitor and record subsurface conditions. Well logging typically involves an examination of core samples, and moving sensors up or down the well bores. Sensors are used to measure, for example, electrical resistance, acoustic properties, natural radioactivity and density of the formation surrounding the well. However, these measurements do not produce a real-time, overall picture of conditions in the formation. They disclose only a static and partial picture of the conditions in the formation.

SUMMARY OF THE INVENTION

An aspect of at least one embodiment of the present invention involves a method for real time sensing of conditions in a subsurface geologic formation comprising the steps of heating the subsurface geologic formation, transmitting a radio frequency pulse into the geologic formation using a time domain reflectometer electrically connected to an open wire transmission line at least partially located in the geologic formation, receiving a reflected radio frequency pulse, and determining the impedance corresponding to the reflected radio frequency pulse.

Another aspect of at least one embodiment of the present invention involves an apparatus for real time sensing of conditions in a subsurface geologic formation comprising an open wire transmission line located at least partially in the subsurface geologic formation that is heated for the extraction of hydrocarbons, and a time domain reflectometer electrically connected to the open wire transmission line.

Another aspect of at least one embodiment of the present invention involves the use of oil well casings as the antennas for the time domain reflectometer.

Yet another aspect of at least one embodiment of the present invention involves the use of common mode chokes on the open wire transmission lines to send RF signals into the subsurface geological formation instead of surface equipment.

Yet another aspect of at least one embodiment of the present invention involves the use of a resistive load at the end of open wire transmission lines.

Other aspects of the invention will be apparent from this disclosure.

DETAILED DESCRIPTION OF THE PREFERRED EMBODIMENTS

The subject matter of this disclosure will now be described more fully, and one or more embodiments of the invention are shown. This invention may, however, be embodied in many different forms and should not be construed as limited to the embodiments set forth herein. Rather, these embodiments are examples of the invention, which has the full scope indicated by the language of the claims.

Figure 1:
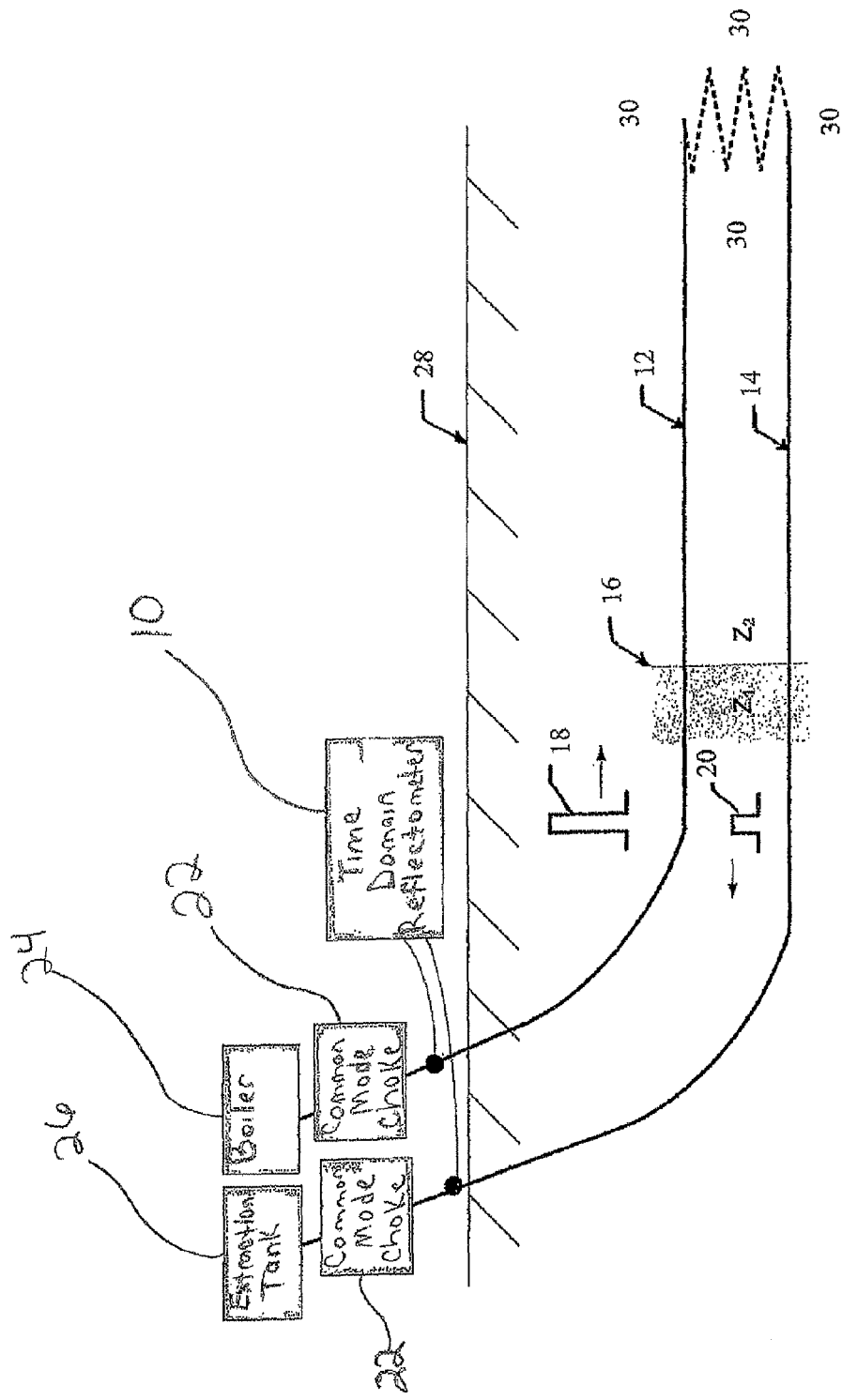
FIG. 1 depicts an embodiment of the invention in a steam assisted gravity drainage process.

FIG. 1 depicts an embodiment of the present invention in conjunction with a steam assisted gravity drainage (SAGD) system for in situ processing of hydrocarbons. Steam for the system is generated in boiler 24 and is injected below ground surface 28 into formation 30. If the steam heats formation 30 sufficiently, hydrocarbons in the formation, condensed steam, and possibly other liquids in the formation will drain down to drainage extraction pipe 14. The liquids are then pumped into extraction tank 26 for storage and/or further processing.

A time domain reflectometer 10 is electrically connected to steam injection pipe 12 and drainage extraction pipe 14. Further details regarding the connection are described with regard to FIG. 3. Steam injection pipe 12 and drainage extraction pipe 14 serve as antennas for time domain reflectometer 10, and form a transmission line of the "open wire" type. During the extraction process, time domain reflectometer 10 transmits a short rise time RF pulse 18 along steam injection pipe 12. Any electrical characteristic impedance discontinuity encountered by pulse 18 as it travels along steam injection pipe 12 will cause a reflected pulse 20 to return to time domain reflectometer along drainage extraction pipe 14. The characteristics of reflected pulse 20 are a function of the impedance discontinuity encountered by pulse 18. The impedance discontinuity is in turn a function of the physical properties of the materials encountered by pulse 18.

For example, if pulse 18 encounters a water and liquid hydrocarbon interface 16, reflected pulse 20 will exhibit, for example, a characteristic magnitude caused by the particular impedance discontinuity associated with the interface of those materials. Here, the impedance associated with the interface between hydrocarbon having impedance $Z_1$ and water having impedance $Z_2$. This permits an operator to sense the existence of that condition in formation 30 by observing the characteristics of reflected pulse 20. The time it takes reflected pulse 20 to reach time domain reflectometer 10 is a function of the distance of the impedance discontinuity from time domain reflectometer 10. This permits the operator to determine approximately where in formation 30 interface 16 exists. The lower the frequency of the transmitted pulse, the longer the distances that can be sensed. Common mode chokes 22, such as ferrite blocks or toroids clamped around the well pipes, prevent pulses 18 and 20 from travelling away from time domain reflectometer 10 and formation 30 into surface equipment, such as boiler 24 and extraction tank 26.

Figure 2:
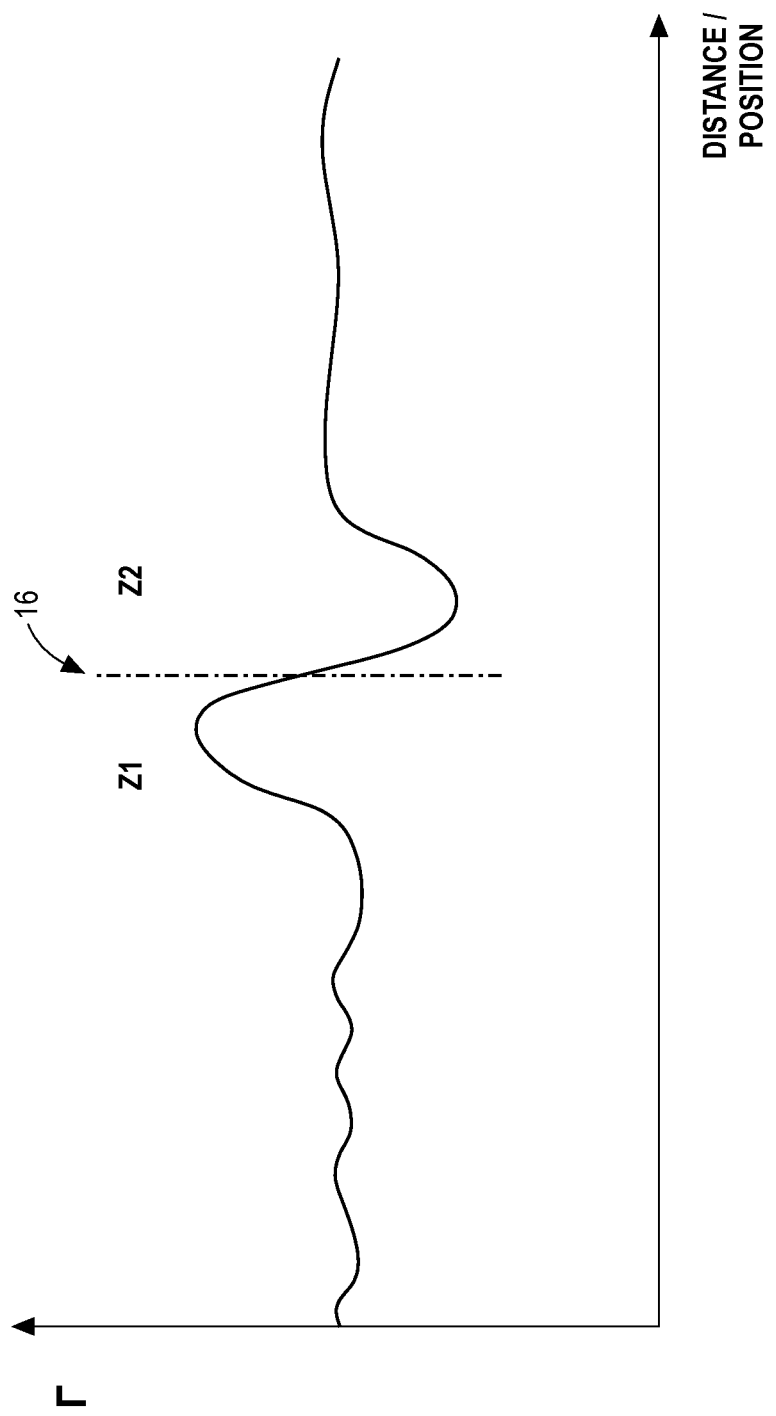
FIG. 2 is a graph of the reflection coefficient versus the distance to the reflecting position.

FIG. 2 graphically illustrates the change in reflectivity coefficient r over distance/position as pulse 18 encounters water and hydrocarbon interface 16. The X axis is both time and position along the metallic pipes. The Y axis is the reflection coefficient, r, which is a function of the electrical (wave) impedances of the hydrocarbon materials, $Z_1$, and the water, $Z_2$. Impedance is in turn a function of the physical properties of the materials, hydrocarbon and water in this example. These physical properties include permittivity, permeability, and conductivity. Formulaically, r is generally described as follows: $r=(Z_0-Z_D)/(Z_0+Z_D)$ where r is the reflectivity coefficient, $Z_0$ is the characteristic impedance associated with the transmission medium, and $Z_D$ is the characteristic impedance associated with the discontinuity. As background, the characteristic impedance of electromagnetic waves in air is $120\pi$ or 377 Ohms, and the characteristic impedance of dielectric only media is $120\pi/\sqrt{\epsilon_r}$, where $\epsilon_r$ is the relative permittivity of the dielectric. Fresh water having negligible conductivity then has a characteristic wave impedance Z of $120\pi/\sqrt{81}=41$ Ohms. Thus, for example, the reflection coefficient between air and water would be $377-41/377+41=0.8$.

In general, only isoimpedance magnetodielectric materials, e.g. those with a magnetic permittivity ($\mu_r$) equal to their relative permittivity ($\epsilon_r$) are free from reflective boundary properties. For example, as characteristic impedance of dual dielectric-magnetic materials is $120\pi(\sqrt{\mu_r/\epsilon_r})$, there would be no reflections between media of say $\mu_r=\epsilon_r=10$, and another media of say $\mu_r=\epsilon_r=20$, as they both have a characteristic impedance of $120\pi$. Magnetite can be a bulk nonconductive magnetic-dielectric material but it is not typically matched in $\mu$ and $\epsilon$. The natural occurrence of $(\mu_r=\epsilon_r)>1$ materials is extremely limited or not at all. Thus, the present invention may be suitable for sensing in many subsurface media.

The characteristic impedance of the open wire transmission line, e.g. surge impedance, formed by steam injection pipe 12 and drainage extraction 14 is a function of both the wave impedance of the media and the structure of the transmission line, e.g. the well pipes. The open wire formula $Z=276 (\sqrt{\mu_r/\epsilon_r}) \log_{10} (2D/d)$ describes the transmission line characteristic impedance, where D is the center to center spacing of steam injection pipe 12 and drainage extraction pipe 14 and d is the diameter of the pipe. In practice it may not be necessary to know or establish the transmission line characteristic impedance as only the reflections from media interfaces may be of interest. Additionally, it is not necessary that the well pipes by circular in cross section. Most types of unshielded TEM (transverse electromagnetic) type transmission lines are suitable for the present invention, such as a balanced microstrip (two plates or strips), stipline, etc.

Figure 3:
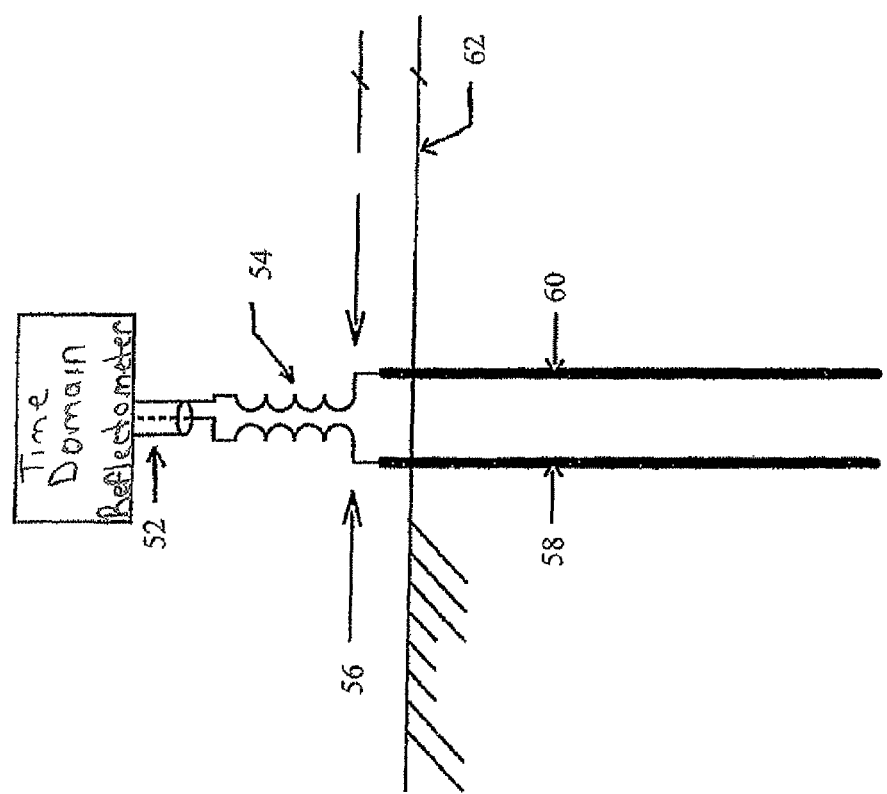
FIG. 3 depicts an embodiment of the invention having a coaxial connection on the time domain reflectometer.

Turning now to FIG. 3, time domain reflectometer 50 is electrically connected to antennas 58 and 60. The connection includes a Balun transformer 54 since the coaxial connection 52 adjacent time domain reflectometer 50 is unbalanced, but the open wire transmission line formed by antennas 58 and 60 is balanced. Time domain reflectometer 50 is preferably a vector network analyzer, similar to the HP8510 series by Hewlett Packard (now Agilent) Corporation of Palo Alto, Calif. The balun transformer 54 may include an impedance transformation ratio, such that the typical 50 ohm impedance of the time domain reflectometer is adjusted downwards. Well formations may present a resistive load to the time domain reflectometer in the milliohm range.

The operation of this embodiment is similar to the SAGD embodiment of FIG. 1. A pulse (not depicted) is transmitted by time domain reflectometer 50 below surface 62, and if that pulse encounters an impedance discontinuity (not shown), a reflected pulse (not shown) will return to time domain reflectometer 50 that will exhibit characteristics caused by the particular impedance discontinuity. This permits an operator to sense the existence of a particular physical condition around antennas 58 and 60 by observing, for example, the characteristic magnitude of the reflected pulse. The time it takes the reflected pulse to reach time domain reflectometer 50 is a function of the distance of the impedance discontinuity from time domain reflectometer 50. This permits the operator to determine approximately where the condition exists along antennas 58 and 60, and d is the diameter of antennas 58 and 60. Calibration and zeroing of time domain reflectometer 50 is accomplished by short circuiting the connections at network analyzer calibration plane 56.

The electrical structure of steam injection pipe 12 and drainage extraction pipe 14 may be operated in differential mode (opposite current flow in each conductor) or in common mode (currents in the same direction in each conductor). The differential mode may be preferred however for ease of excitation. The balun 54 and the FIG. 3 connections serve to enforce the differential mode condition by suppressing any common mode currents that might arise from due to stray capacitance to power conductors etc. The two pipes provide a ready driving discontinuity with respect to each other. As background on baluns, the text "Building and Using Baluns and Ununs", Jerry Sevick, W2FMI, CQ Communications, Copyright 1992 is identified. The term balun may be a contraction of the words balanced and unbalanced, and pronounced accordingly.

Operation at frequency ranges in VLF (3 to 30 KHz) may be preferential for formations including fresh water at ranges of 1,000 to 10,000 feet, although the invention is not so limited. Any frequency ranges may in fact be used by the present invention providing there is sufficient penetration in the media and sufficient signal to noise. For instance, with saltwater the frequencies may be at ELF (3 to 30 Hz). Low noise windows may exist near the surface of the earth between 1 to 4 KHz as this region is above most harmonics of the Schuman Resonance and below the ~10 KHz lower cutoff of the earth ionosphere cavity. The work "VLF Radio Engineering", Arthur D. Watt, $1^{st}$ Edition 1967, Pergamon Press is identified as a reference in its entirety. The electrical noise may comprise telluric currents, as may be appreciated by those in hydrocarbon prospecting. In the United States, the RF spectrum below 9 KHz is not allocated (NTIA Table Of Frequency Allocations, US Dept of Commerce, October 2003) such that this spectrum may have advantages. Resolution or granularity in sensing the underground formations can be a function of reflectometer bandwidth which in turn is a function of the upper end of the low frequency window available in subsurface electromagnetic propagation.

Figure 4:
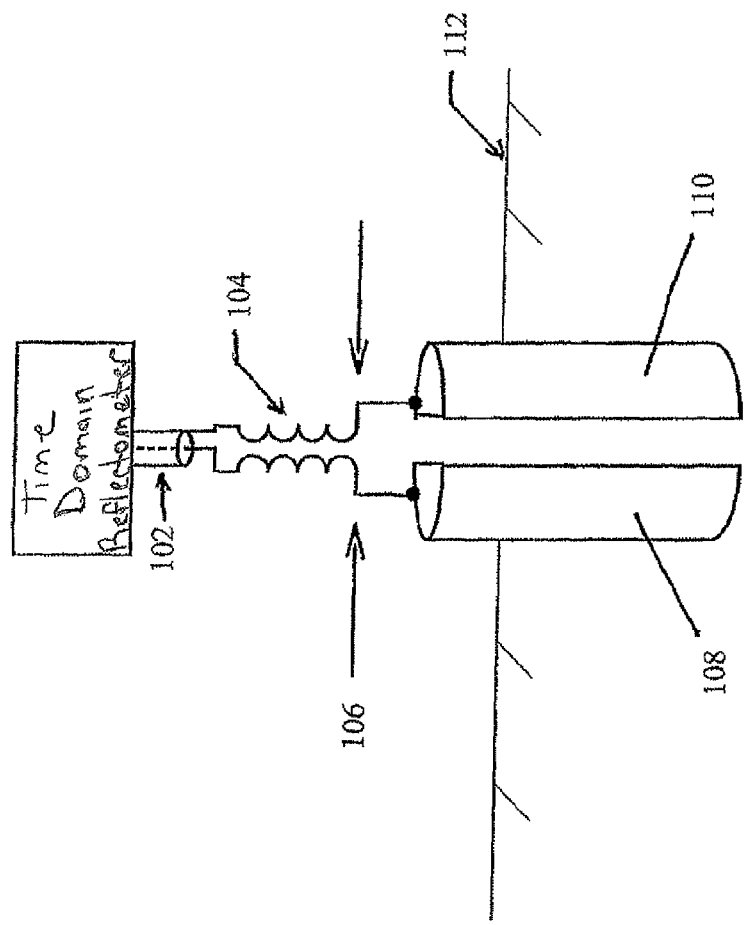
FIG. 4 depicts an embodiment of the invention employing a split tube for a single well bore as the open wire transmission line.

FIG. 4 is yet another embodiment of the invention wherein a lowered split tube well casing comprised of sections 108 and 110 serves as the antennae. Similar to FIGS. 1 and 3, a time domain reflectometer 100 is electrically connected to antennas 108 and 110. The connection includes a 1:1 Balun transformer 104 since the coaxial connection 102 adjacent time domain reflectometer 100 is unbalanced, but the open wire transmission line formed by well casings 108 and 110 is balanced. Again, time domain reflectometer 100 is preferably a vector network analyzer such as HP8510 or equivalent devices with provisions for time domain measurements.

The operation of this embodiment is similar to the embodiments of FIGS. 1 and 3. A pulse (not depicted) is transmitted by time domain reflectometer 100 below surface 112, and if that pulse encounters an impedance discontinuity (not shown), a reflected pulse (not shown) will return to time domain reflectometer 100 that will exhibit characteristics caused by the particular impedance discontinuity. This permits an operator to sense the existence of a particular physical condition around antennas 108 and 110 by observing, for example, the magnitude of the reflected pulse. The time it takes the reflected pulse to reach time domain reflectometer 100 is a function of the distance of the impedance discontinuity from time domain reflectometer 100. This permits the operator to determine approximately where the condition exists along well casing antennas 108 and 110. Calibration and zeroing of time domain reflectometer 100 is accomplished by short circuiting the connections at network analyzer calibration plane 106.

In any of the disclosed embodiments, a resistive load can be placed at the end of the open wire transmission line located in the geologic formation to enhance the capabilities of the invention. For example, a 50 ohm resistor could be used to connect the ends of steam injection pipe 12 and steam drainage extraction pipe 14 located in the geologic formation to eliminate the inherent reflection at the end of the pipes and increase the sensitivity of time domain reflectometer 10. There can be, for instance, reduced multiple transits of the pulse of the transmission line to minimize ringing.

Figure 5:
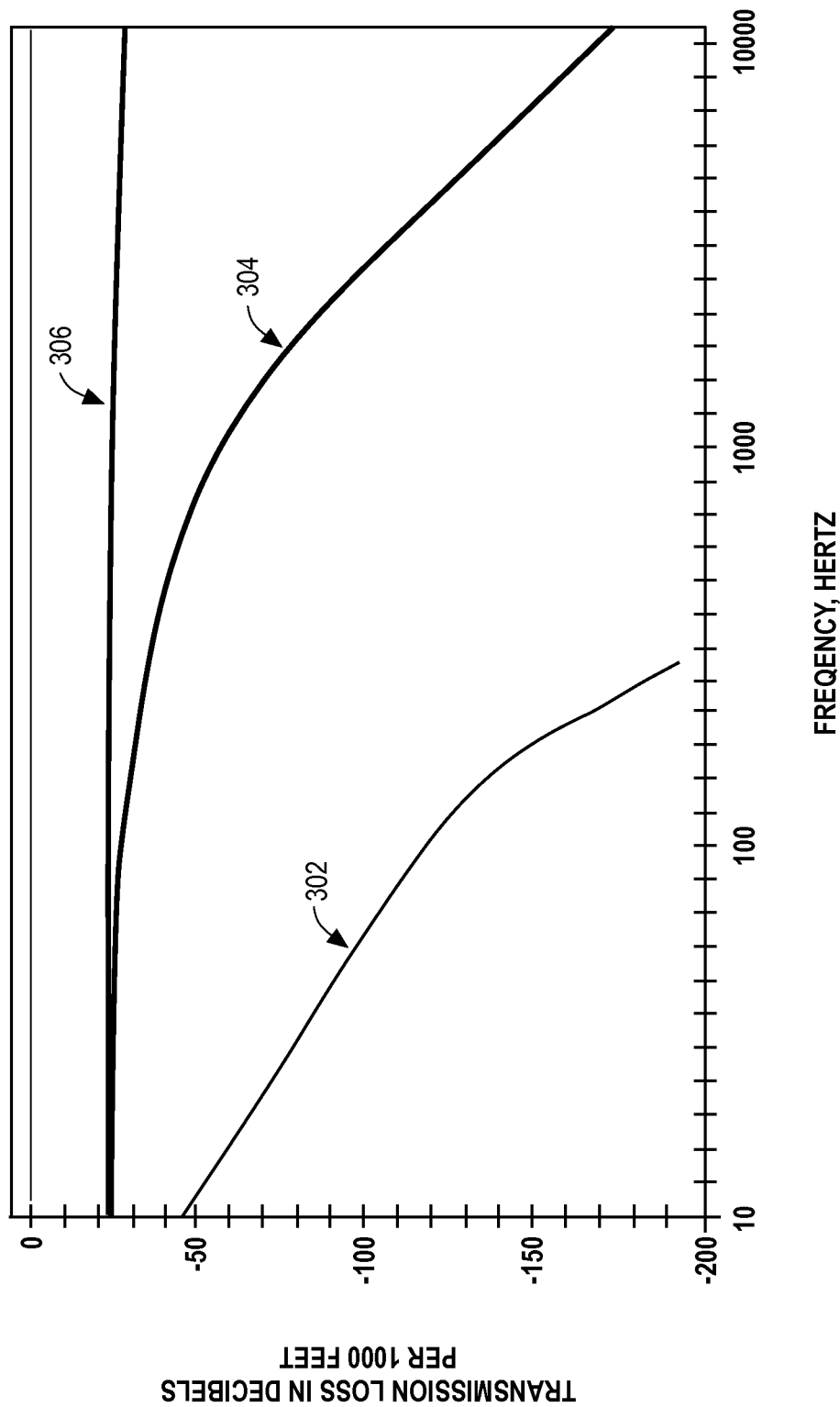
FIG. 5 is a graph of the transmission loss through open wire line type transmission line formed of petroleum well casings.

FIG. 5 graphs possible transmission loss through 1000 feet of an open wire transmission line formed of steel petroleum well casings. The hypothetical SAGD well/open wire transmission line had steel casings of 6 inches outer diameter spaced 15 feet apart center to center. Curve 302 is for an underground medium of pure seawater which has a conductivity $\sigma=5.0$, and a relative permittivity $\epsilon_r=81$. Curve 304 is for a homogenous underground medium of $\sigma=0.1$, $\epsilon_r=13$, which is sometimes typical of soil. Curve 306 is for a homogenous underground medium of $\sigma=0.001$, $\epsilon_r=13$, which is sometimes typical of rock. The curves were obtained by numerical electromagnetic modeling using the finite element method and a Summerfeld Norton algorithm for near field effects. Time domain reflectometer 10 should have sufficient capability to accommodate transmission loss both out and back, e.g. the transmission loss doubled.

Moreover, 3 or more well pipes may be employed for the real time reflectometry remote sensing. Spatial, image mapping techniques and the various transforms may be employed to provide increased granularity or resolution. Additional well pipes when orthogonally oriented can provide 3 dimensional picture information, such as voxels. An image processor (not shown) may be included in with the present invention to interpret scattering parameters measured by time domain reflectometer such as to form an image.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged either in whole or in part. Therefore, the spirit and scope of the appended claims should not be limited to the description of the preferred versions contained herein.

The invention claimed is:

1. An apparatus for sensing a subterranean formation having a pair of laterally extending first and second wellbores therein, the apparatus comprising:
    a first wellbore transmission line for the laterally extending first wellbore;
    a second wellbore transmission line for the laterally extending second wellbore;
    a time domain reflectometer coupled to respective proximal ends of said first and second wellbore transmission lines and configured to sense an impedance of the subterranean formation; and
    a resistive load coupled across distal ends of said first and second wellbore transmission lines.

2. The apparatus according to claim 1, wherein the first wellbore transmission line comprises an injector well casing; and wherein the second wellbore transmission line comprises a producer well casing.

3. The apparatus according to claim 1, further comprising a respective impedance matching element coupled between said time domain reflectometer and each of said first and second wellbore transmission lines.

4. The apparatus according to claim 3, wherein each of said impedance matching elements comprises a balun transformer.

5. The apparatus according to claim 1, further comprising an RF choke surrounding at least one of said first and second wellbore transmission lines.

6. An apparatus for sensing a subterranean formation having a laterally extending wellbore therein, the apparatus comprising:
    first and second wellbores transmission lines for the laterally extending wellbore;

a time domain reflectometer coupled to respective proximal ends of said first and second wellbore transmission lines and configured to sense an impedance of the subterranean formation; and a resistive load coupled across distal ends of said first and second wellbore transmission lines.

7. The apparatus according to claim 6, wherein said first and second wellbore transmission lines comprise first and second portions of split injector well casings.

8. The apparatus according to claim 6, wherein said first and second wellbore transmission lines comprise first and second portions of split producer well casings.

9. The apparatus according to claim 6, further comprising a respective impedance matching element coupled between said time domain reflectometer and each of said first and second wellbore transmission lines.

10. The apparatus according to claim 9, wherein each of said impedance matching elements comprises a balun transformer.

11. The apparatus according to claim 6, further comprising an RF choke surrounding at least one of said first and second wellbore transmission lines.

12. A method of sensing a subterranean formation comprising:

forming a pair of laterally extending first and second wellbores in the subterranean formation;

positioning first and second wellbore transmission lines in the first and second laterally extending wellbores, respectively;

coupling a resistive load coupled across the distal ends of the first and second wellbore transmission lines; and operating a time domain reflectometer coupled to the first and second wellbore transmission lines to sense an impedance of the subterranean formation.

13. The method according to claim 12, further comprising coupling a respective impedance matching element between the time domain reflectometer and each of the first and second wellbore transmission lines.

14. The method according to claim 12, further comprising using the first and second laterally extending wellbores to perform Steam Assisted Gravity Drainage (SAGD) production.

15. A method of sensing a subterranean formation comprising:

forming a laterally extending wellbore in the subterranean formation;

positioning first and second transmission lines in the laterally extending wellbore;

coupling a resistive load coupled across the distal ends of the first and second wellbore transmission lines; and operating a time domain reflectometer coupled to the first and second wellbore transmission lines to sense an impedance of the subterranean formation.

16. The method according to claim 15, further comprising coupling a respective impedance matching element between the time domain reflectometer and each of the first and second wellbore transmission lines.

* * * * *